(12) United States Patent
Omori

(10) Patent No.: US 10,736,346 B2
(45) Date of Patent: Aug. 11, 2020

(54) METHOD FOR PRODUCING HEAT-RESISTANT SOLID ROUX

(71) Applicant: FUJI OIL HOLDINGS INC., Osaka (JP)

(72) Inventor: Hitomi Omori, Tsukubamirai (JP)

(73) Assignee: FUJI OIL HOLDINGS INC., Osaka (JP)

( * ) Notice: Subject to any disclaimer, the term of this patent is extended or adjusted under 35 U.S.C. 154(b) by 227 days.

(21) Appl. No.: 15/546,062

(22) PCT Filed: Jan. 20, 2016

(86) PCT No.: PCT/JP2016/051616
§ 371 (c)(1),
(2) Date: Jul. 25, 2017

(87) PCT Pub. No.: WO2016/121604
PCT Pub. Date: Aug. 4, 2016

(65) Prior Publication Data
US 2017/0367385 A1 Dec. 28, 2017

(30) Foreign Application Priority Data

Jan. 30, 2015 (JP) .................................. 2015-016740

(51) Int. Cl.
*A23L 23/10* (2016.01)
*A23L 29/30* (2016.01)

(52) U.S. Cl.
CPC ............... *A23L 23/10* (2016.08); *A23L 29/30* (2016.08); *A23L 29/37* (2016.08); *A23V 2002/00* (2013.01)

(58) Field of Classification Search
CPC .......... A23L 23/10; A23L 29/30; A23L 29/37; A23V 2002/00
USPC ....................................................... 426/589
See application file for complete search history.

(56) References Cited

U.S. PATENT DOCUMENTS

| | | | | |
|---|---|---|---|---|
| 3,039,935 A | * | 6/1962 | Rentshler | C13K 1/10 435/94 |
| 4,568,551 A | * | 2/1986 | Seewi | A23L 23/00 426/99 |
| 5,916,371 A | * | 6/1999 | Chaen | A21D 2/181 127/29 |

FOREIGN PATENT DOCUMENTS

| | | | | |
|---|---|---|---|---|
| EP | 1871184 A1 | * | 1/2008 | ............. A23P 10/25 |
| JP | 53-26358 | | 3/1978 | |
| JP | 53026358 A | * | 3/1978 | |
| JP | 56-169561 | | 12/1981 | |
| JP | 8-116933 | | 5/1996 | |
| JP | 08116933 A | * | 5/1996 | |
| JP | 10-327824 | | 12/1998 | |
| JP | 2001-258474 | | 9/2001 | |
| JP | 2001269145 A | * | 10/2001 | |
| JP | 2003169644 A | * | 6/2003 | |
| JP | 2009-81999 | | 4/2009 | |
| JP | 2010-200654 | | 9/2010 | |
| JP | 2011188874 A | * | 9/2011 | |
| JP | 2013-255477 | | 12/2013 | |
| JP | 2014-50343 | | 3/2014 | |

OTHER PUBLICATIONS

Physical Properties of fats and Oils; source: http://www.dgfett.de/nnaterial/physikalische_eigenschaften.pdf, Date May 23, 2013, pp. 29 Date verified using www.archive.org (Year: 2013).*
International Preliminary Report on Patentability dated Aug. 1, 2017 in International (PCT) Application No. PCT/JP2016/051616.
International Search Report dated Feb. 16, 2016 in International (PCT) Application No. PCT/JP2016/051616.
San-Ei Sucrochemical Co., Ltd., "TDH", [online], Jan. 7, 2010, [retrieval date Feb. 9, 2016], internet (with its English translation), 2 pages.
San-Ei Sucrochemical Co., Ltd., "High-MESH", [online], Jan. 9, 2010, [retrieval date Feb. 9, 2016], I Internet (with its English translation), 2 pages.

* cited by examiner

*Primary Examiner* — Jyoti Chawla
(74) *Attorney, Agent, or Firm* — Wenderoth, Lind & Ponack, L.L.P.

(57) ABSTRACT

The present invention provides a method for producing a solid roux which has excellent shape retention properties even in summer, does not undergo seepage of liquid oily components to the surface or whitening of the surface, melts well in the mouth and has a reduced content of trans fatty acids and saturated fatty acids. A solid roux base, which contains specified quantities of table sugar and one or more types of sugar selected from among maltose, trehalose, fructose, palatinose, reduced palatinose, maltitol, erythritol, lactitol and sorbitol, is solidified by means of heat treatment at 100-160° C. In addition, solid oils and fats having a relatively low content of trans fatty acids and saturated fatty acids and having melting points of 40° C. or lower are used as the oils and fats for the solid roux.

17 Claims, No Drawings

METHOD FOR PRODUCING HEAT-RESISTANT SOLID ROUX

TECHNICAL FIELD

The present invention relates to a method for producing a solid roux excellent in heat resistance.

BACKGROUND ART

A solid roux, which is generally used for cooking curry, hash, stew, and the like, is made by mixing and heating flour, edible fat, seasoning, and the like followed by cooling to solidify.

An appropriate heat-resistant and shape-retaining property in a distribution process and good de-molding property in a production process of a solid roux are required for the above-described edible fat. Thus, solid fat which is comparatively hard and has high melting point, such as hydrogenated oil made from lard or beef tallow, or mixed oil thereof, or hydrogenated oil or interesterified oil made from vegetable fat such as palm oil, or mixed oil thereof, has been used as the edible fat.

That is, physical properties required for the solid fat for the solid roux include that: a form-retaining property is kept even in summer; a liquid oil component does not seep; a phenomenon that a surface of the solid roux whitens like a fungus is less likely to occur during storage; and a good de-molding property after cooling and solidifying in the production of the solid roux.

The following inventions have been disclosed for a fat for solid roux that fulfills the above-described required physical properties.

Patent Document 1 discloses a fat composition for solid roux, which is good in shape-retaining property, melting property, and texture, having low trans acid content in the fat, and showing good de-molding property and little cracking in the production of the roux. This fat composition consists of 90 to 98% by mass of mixed oil of 50 to 90 parts by mass of beef tallow or lard and 10 to 50 parts by mass of fully hydrogenated beef tallow or fully hydrogenated lard, and 2 to 10% by mass of high erucic fully hydrogenated oil. And the fat composition shows more excellent shape-retaining property, melting property, and texture compared with a conventional partially hydrogenated beef tallow or partially hydrogenated lard.

Patent Document 2 relates to an edible processed fat and a food product which are hard to get soft even in summer, hard to solidify even in a refrigerator and excellent in shape retention and foam stability. The edible processed fat includes polyhydric alcohol fatty acid ester containing behenic acid as main constituent fatty acid. The edible processed fat is added into a food product such as curry roux to ensure a food product that is hard to get soft even in summer, hard to solidify even in the refrigerator, and excellent in the shape-retaining property and the foam stability.

PRIOR ART DOCUMENTS

Patent Documents

Patent Document 1: JP 2009-81999 A
Patent Document 2: JP 2010-200654 A

The method of Patent Document 1 provides more excellent shape-retaining property, melting property, and texture compared with the conventional partially hydrogenated beef tallow or partially hydrogenated lard. However, the fat composition remains as unmelted residue during cooking, or solidifies during eating, and thus it shows poor melting speed in the mouth because a content of fully hydrogenated oil is relatively high. It also has problem that a saturated fatty acid content derived from the fully hydrogenated oil is slightly high while the trans acid content is reduced.

Patent Document 2 is a method that can significantly reduce both contents of trans fatty acid and saturated fatty acid because the shape-retaining property is added by an emulsifier having relatively high melting point.

However, when the processed fat is added into the solid roux, the liquid oil component severely seeps from the surface of the solid roux during the distribution in summer, and there is a problem that the liquid oil component adheres to a wrapping paper of the solid roux. Accordingly, this method is difficult to be used for the solid roux.

Recently, it is shown that a risk of developing heart disease increases by ingesting trans fatty acid and saturated fatty acid. Thus, it is preferred to reduce the contents of trans fatty acid and saturated fatty acid in fat. However, as described above, it is difficult to achieve the solid roux that ensures the reduction of the contents of trans fatty acid and saturated fatty acid, in addition to the shape-retaining property in summer, the resistance against seeping of the liquid oil component, the resistance against whitening of the surface, and the good melting speed in the mouth.

SUMMARY OF INVENTION

Problems to be Solved by Invention

As described above, a method for producing a solid roux that enables to reduce contents of trans fatty acid and saturated fatty acid, as well as to provide shape-retaining property in summer, resistance against seeping of liquid oil component, resistance against whitening of the surface, and good melting speed in the mouth has been desired.

An object of the present invention is to provide a method for producing a solid roux that enables to provide shape-retaining property in summer, resistance against seeping of liquid oil component, resistance against whitening of the surface, and good melting speed in the mouth, which are physical properties required for the solid roux, and reduction of contents of trans fatty acid and saturated fatty acid at the same time.

Means for Solving the Problems

The present inventors have extensively studied for the above described problem. As a result, they have found that a solid roux having heat resistance at 40° C. or more that enables to bear with a storage in summer, and excellent appearance and melting speed in the mouth may be produced by heating a dough for the solid roux containing specific amounts of one or two or more saccharides selected from sucrose, maltose, trehalose, fructose, palatinose, reducing palatinose, maltitol, erythritol, lactitol at 100 to 160° C. to solidify the dough. The present invention has been completed based on the findings.

That is, the present invention is:

(1) A method for producing a heat-resistant solid roux, including heating a dough for the solid roux at 100 to 160° C. to solidify the dough, where the dough contains 1 to 20% by weight of one or two or more saccharides selected from sucrose, maltose, trehalose, fructose, palatinose, reducing palatinose, maltitol, erythritol, lactitol, and sorbitol;

(2) The method for producing a heat-resistant solid roux of (1), where the dough contains one or two or more saccharides selected from trehalose, palatinose, and glucose;

(3) The method for producing a heat-resistant solid roux of (1), where the dough contains 1 to 15% by weight of glucose-1-hydrate as the glucose;

(4) The method for producing a heat-resistant solid roux of any one of (1) to (3), where the temperature of the heat treatment is 120 to 160° C.

(5) A heat-resistant solid roux of any one of (1) to (4), obtained by using a fat composition for the solid roux having 40° C. or less of melting point; and (6) A processed food obtained by using the heat-resistant solid roux of any one of (1) to (5).

Effects of Invention

The present invention enables to produce a solid roux that shows shape-retaining property in summer, resistance against seeping of a liquid oil component, resistance against whitening of the surface, and good melting speed in the mouth, as well as reduced content of trans fatty acid and saturated fatty acid. The heat-resistant solid roux of the present invention has an excellent heat resistance even in a temperature range that exceeds a melting point of the fat in the solid roux, for example, 40 to 90° C. Thus, the solid roux of the present invention facilitates the production of processed food obtainable by using the solid roux in summer or in a tropical region. In addition, the present invention provides the solid roux having excellent heat resistance even if the melting point of the fat in the solid roux is comparatively low, for example, 40° C. or less. Thus, the present invention enables to reduce the contents of trans fatty acid and saturated fatty acid by a selection of fat to be used.

MODE FOR CARRYING OUT THE INVENTION

The present invention will be described in detail in the following.

A solid roux of the present invention has a solid shape at ordinary temperature, and is used for cooking curry, hash, stew, and the like, and is widely used for household use and for professional use, for example, in restaurants and feeding services because of its convenience in cooking.

A conventional method for producing a solid roux includes mixing and heating flour and a solid fat composition, mixing an auxiliary material if necessary, and pouring it into a container, and cooling and solidifying it by a cooling method such as cooling by wind.

A heat-resistant solid roux of the present invention may be produced, for example, by the following method. Flour, saccharide and solid fat composition are mixed and heated, and an auxiliary material is mixed if necessary, the obtained dough is poured into a container, and then, a heat treatment to 100 to 160° C. is performed to solidify the dough. Then, for example, the solidified dough is cooled in a refrigerator or a cooling tunnel with cold air at 0 to 15° C., or cooled by leaving it at room temperature of 30° C. or less to obtain a distributable heat-resistant solid roux.

A heat-resistant solid roux of the present invention contains 1 to 20% by weight of one kind or two or more kinds of saccharides selected from sucrose, maltose, trehalose, fructose, palatinose, reducing palatinose, maltitol, erythritol, lactitol, and sorbitol as an essential component. If a content of one kind or two or more kinds of saccharides is less than 1% by weight, it is unpreferable since a heat-resistant and shape-retaining property is insufficient in a temperature range that exceeds 40° C. after the heat treatment. If the content exceeds 20% by weight, it is unpreferable since generation of roughness is likely to occur by an increase of a viscosity and coarsening of a granularity, of a dough for the solid roux.

More preferably, the heat-resistant solid roux of the present invention contains 1 to 20% by weight of any one kind or two or more kinds of trehalose, palatinose, and glucose among the above-described saccharides. By using these saccharides at relatively low amount, for example, 1 to 10% by weight, the solid roux may show the heat-resistant and shape-retaining property in the temperature range that exceeds the melting point of the fat in the solid roux, and an increase of a viscosity of the dough for the solid roux, and a generation of course texture due to coarsening of the granularity in the dough for the solid roux tends to be less likely to occur.

Most preferably, the heat-resistant solid roux of the present invention contains glucose-1-hydrate at 1 to 15% by weight as glucose. A content of glucose-1-hydrate is more preferably 3 to 12% by weight, and most preferably 5 to 10% by weight. If the content is less than 1% by weight, it is unpreferable since the heat-resistant and shape-retaining property is insufficient in the temperature range that exceeds 40° C. after the heat treatment. If the content exceeds 15% by weight, the increase of the viscosity of the dough for the solid roux tends to be likely to occur.

In a heat-resistant solid roux of the present invention, an adding amount of flour is not particularly limited, but preferably 3 to 25% by weight, and further preferably 5 to 20% by weight. If the adding amount of the flour exceeds 25% by weight, an appropriate viscosity may not be given to the processed food using the solid roux, and the texture sometimes lacks smoothness. If the adding amount of the flour is less than 3% by weight, the viscosity of the processed food using the solid roux is not high enough, and the obtained processed food sometimes lacks rich taste.

A fat composition that may be used for a heat-resistant solid roux of the present invention is not particularly limited. For example, vegetable fat such as soybean oil, rapeseed oil, corn oil, cottonseed oil, peanut oil, sunflower oil, rice bran oil, safflower oil, high-oleic safflower oil, olive oil, sesame oil, cacao butter, palm oil, coconut oil, and palm kernel oil, and animal fat such as beef tallow, lard, and milk fat may be used. Additionally, the examples include processed fat such as fractionated fat, hydrogenated fat, and interesterified fat thereof, and mixed fat thereof. When good melting speed in the mouth is desired in addition to satisfying heat-resistant and shape-retaining property, resistance against seeping of a liquid oil component and resistance against whitening of a surface in the temperature range that exceeds a melting point of the fat in the solid roux, it is preferred to use solid fat having a melting point of 40° C. or less selected from the above-described processed fat such as fractionated fat, hydrogenated fat, interesterified fat and mixed fat thereof. Furthermore, when reduction of trans fatty acid and saturated fatty acid is desired together, it is preferred to use solid fat having a melting point of 40° C. or less of mixed fat any of processed fat such as fractionated fat, hydrogenated fat, interesterified fat, and vegetable fat such as soybean oil, rapeseed oil, corn oil, cottonseed oil, peanut oil, sunflower oil, rice bran oil, safflower oil, high-oleic safflower oil, olive oil, sesame oil, cacao butter, palm oil, coconut oil, and palm kernel oil, and animal fat such as beef tallow, lard, and milk fat. If the melting point of the solid fat exceeds 40° C., the melting speed in the mouth tends to decrease.

According to the present invention, even when solid fat having a melting point, for example, 40° C. or less is used as the fat in the solid roux, an excellent heat resistance may be obtained in a temperature range that exceeds 40° C., thus facilitating reduction of contents of the trans fatty acid and the saturated fatty acid. For example, as the fat for the solid roux that reduces the trans fatty acid, partially hydrogenated fat is not added, and solid fat having a melting point of 40° C. or less by combination of one or more kinds of interesterified oil of non-hydrogenated oil, fractionated oil, and non-hydrogenated animal or vegetable oil may be used. Additionally, as the fat for the solid roux that reduces saturated fatty acid, solid fat having a melting point of 40° C. or less prepared by mixing solid fat derived from one or more kinds of interesterified oil of non-hydrogenated oil, fractionated oil, and non-hydrogenated animal or vegetable oil, and liquid fat, may be used. If the melting point of the fat in the solid roux is, for example, less than 15° C., the seeping of the liquid oil component from a surface of the solid roux after the heat treatment tends to occur.

In the heat-resistant solid roux of the present invention, an adding amount of the fat composition for solid roux is not particularly limited, but preferably 25 to 70% by weight, and further preferably 30 to 60% by weight. If the adding amount of the solid fat composition of the present invention is less than 25% by weight, an appropriate viscosity cannot be given to the processed food using the solid roux, and a texture sometimes lacks smoothness. If the adding amount of the fat composition for solid roux of the present invention exceeds 70% by weight, the viscosity of the processed food including the solid roux decreases, and the processed food is sometimes oily.

A heat treatment temperature of the dough for the solid roux of the present invention is 100 to 160° C., further preferably 120 to 160° C., and most preferably 120 to 150° C. If the heat treatment temperature is less than 100° C., it is unpreferable since the heat-resistant and shape-retaining property in the temperature range that exceeds 40° C. after the heat treatment is insufficient. If the heat treatment temperature exceeds 160° C., it is unpreferable since a burnt deposit is likely to occur at the surface of the solid roux, and a taste of the solid roux tends to be deteriorated.

Further components that may be contained in the heat-resistant solid roux of the present invention include spice such as curry, cacao mass, cocoa powder, dairy products such as whole milk powder, skimmed milk powder, butter milk powder, whey powder, and yogurt powder, grain, pulse, vegetable, meat, seafood, fruit, fruit juice, coffee, nut paste, vegetable proteins such as wheat protein and soybean protein, egg and food product material such as various egg processed products, emulsifier, thickening stabilizer, saltiness agent such as salt and potassium chloride, acidulant such as acetic acid and lactic acid, sweetener such as saccharide and sugar alcohols, *stevia*, and aspartame, colorant such as β-carotene and caramel, and antioxidant such as tocopherol and tea extract. These food product materials and food additives may be used solely or in combination of two or more kinds of them.

The above-described emulsifier includes, for example, lecithin, glycerol fatty acid ester, glycerol acetic acid fatty acid ester, glycerol lactic acid fatty acid ester, glycerol succinic acid fatty acid ester, glycerol diacetyl tartaric acid fatty acid ester, sorbitan fatty acid ester, sucrose fatty acid ester, sucrose acetate isobutyrate, polyglycerol fatty acid ester, polyglycerol condensed ricinoleic acid ester, propylene glycol fatty acid ester, calcium stearoyl lactate, sodium stearoyl lactate, polyoxyethylene sorbitan monostearate, and polyoxyethylene sorbitan monoglyceride.

The above-described thickening stabilizer includes, for example, guar gum, locust bean gum, carrageenan, gum arabic, alginic acids, pectin, xanthan gum, pullulan, tamarind seed gum, *psyllium* seed gum, crystalline cellulose, methyl cellulose, carboxymethyl cellulose, agar, glucomannan, gelatin, and starch.

A water content of the heat-resistant solid roux of the present invention is preferably 2% by weight or less, and further preferably 1% by weight or less. If the water content exceeds an upper limit, it is unpreferable since a problem of occurrence of lumps by the increased viscosity during preparation of the dough and coarsening of solid particles is likely to occur.

A heat treatment period of the dough for the solid roux of the present invention is preferably within 60 minutes, further preferably 10 seconds to 40 minutes, and most preferably 10 seconds to 20 minutes. The heating period depends on a weight and a shape of the solid roux, and a heating method, but in a case of a thick solid roux, if the heating period is less than 10 seconds, it is unpreferable since the heat-resistant shape-retaining property in the desired temperature range that exceeds 40° C. cannot be obtained. If the heating period exceeds 60 minutes, it is also unpreferable since a production efficiency of the solid roux decreases.

A heat treatment method of the dough for the solid roux of the present invention may use various well-known heating means such as hot-air heating, for example, by oven, oven tunnel, and drier at 100 to 200° C., and infrared heating and microwave heating having a heater temperature of 150 to 700° C.

In the present invention, cooling and solidifying may be performed before the above-described heat treatment. That is, after the dough for the heat-resistant solid roux in a molten state prepared by mixing and heating flour, saccharide, solid fat composition, and auxiliary material and additives is poured into a mold for solid roux, cooling and solidifying are performed by, for example, cooling left in the refrigerator at 0 to 15° C., cool-air cooling such as in a cooling tunnel, and cooling left at room temperature of 30° C. or less. Such cooling and solidifying may put the surface of the solid roux removed from the mold after cooling into a smooth state. Then, the above-described heat treatment and cooling are performed to ensure the heat-resistant solid roux having a smooth surface.

The heat-resistant solid roux of the present invention may be widely used for processed food such as various sauces such as curry, white sauce, hash source, and demiglace source, various stews such as curry stew, white stew, and demiglace stew, filling for bread, and topping. Especially, the heat-resistant solid roux of the present invention has an excellent heat-resistant and shape-retaining property in a temperature range that exceeds the melting point of the fat in the solid roux, for example, 40 to 90° C., thus having an advantage that facilitates usage for distribution and cooking in Japan in summer and in the tropical region.

EXAMPLES

Examples of the present invention will be explained in more detail herein below. In the examples, both of % and part mean weight basis.

Heat resistance evaluation and dispersibility into hot water of the solid roux in respective examples were evaluated by the following method and basis.

(Heat Resistance Evaluation)

After a heat-treated solid roux and an unprocessed solid roux were left in a constant-temperature oven at 40° C. for 3 hours, or in a constant-temperature oven at 50° C. for 1 hour, presence/absence of attachment to a finger such that surfaces of the solid roux were touched by hand, presence/absence of oil-off, and presence/absence of deformation were confirmed.

⊙: Excellent (There is no attachment to the finger, oil-off, and deformation)

○: Good (Oil is slightly attached to finger, but there is no deformation)

Δ: Slightly poor (There are attachment to finger and oil-off, but no deformation)

x: Poor (There are much attachment to finger and oil-off, and deformation also occurs)

As an appearance evaluation after storing, presence/absence of occurrence of whitening at the surface of the solid roux was confirmed.

⊙: Excellent (There is no occurrence of whitening, and no change compared with before storing)

○: Good (There is no occurrence of whitening, but appearance is slightly different from that before storing)

Δ: Slightly poor (There is slightly whitening at surface of solid roux)

x: Poor (There is whitening at entire surface of solid roux)

(Dispersibility into Hot Water)

The heat-treated solid roux and the unprocessed solid roux were added into the hot water at 80° C. to confirm the dispersibility.

⊙: Excellent (Dissolution in hot water is quickly, and there is also no occurrence of undissolved remains)

○: Good (The dissolution is slightly slow, but there is no occurrence of undissolved remains)

Δ: Slightly poor (The dissolution is slow, and undissolved remains occur)

x: Poor (There is no dissolution)

Preparation Example 1

Flour roux was prepared by performing roasting treatment to 11 parts of flour and 36 parts of interesterified oil having 46° C. of melting point (manufactured by FUJI OIL CO., LTD., the product name "Parkid V"). Then, 41 parts of the flour dough, 29 parts of curry powder, 13 parts of sucrose, 9 parts of salt, 1.6 parts of sodium glutamate, and 0.4 part of lecithin were heated at 80° C. and mixed by a mixer. The obtained dough was poured into a round aluminum foil container having 3 cm of diameter to 1 cm of thickness, and cooled at 20° C. and solidified to obtain solid roux 1. Trans fatty acid content of Parkid V was of 1.0 g/100 g, and saturated fatty acid content of Parkid V was 59.9 g/100 g.

Preparation Example 2

Solid roux 2 was obtained in the same manner as Preparation Example 1 except that 36 parts of the interesterified oil having 46° C. of melting point (manufactured by FUJI OIL CO., LTD., the product name "Parkid V") in Preparation Example 1 was changed to 18 parts of the interesterified oil having 46° C. of melting point (manufactured by FUJI OIL CO., LTD., the product name "Parkid V") and 18 parts of refined rapeseed oil. Melting point of the mixed oil of 18 parts of Parkid V and 18 parts of the refined rapeseed oil was 36° C. The trans fatty acid content was 1.25 g/100 g, and the saturated fatty acid content was 33.8 g/100 g.

Preparation Example 3

Solid roux 3 was obtained in the same manner as Preparation Example 1 except that 13 parts of sucrose was changed to 5 parts of sucrose and 8 parts of glucose-1-hydrate (manufactured by San-ei Sucrochemical Co., Ltd., the product name "Hi-MESH").

Preparation Example 4

Solid roux 4 was obtained in the same manner as Preparation Example 1 except that 36 parts of the interesterified oil having 46° C. of melting point (manufactured by FUJI OIL CO., LTD., the product name "Parkid V") in Preparation Example 3 was changed to 18 parts of the interesterified oil having 46° C. of melting point (manufactured by FUJI OIL CO., LTD., the product name "Parkid V") and 18 parts of refined rapeseed oil.

Preparation Example 5

Solid roux 5 was obtained in the same manner as Preparation Example 1 except that 13 parts of sucrose in Preparation Example 1 was changed to 5 parts of sucrose and 8 parts of trehalose (manufactured by HAYASHIBARA CO., LTD.).

Preparation Example 6

Solid roux 6 was obtained in the same manner as Preparation Example 1 except that 36 parts of the interesterified oil having 46° C. of melting point (manufactured by FUJI OIL CO., LTD., the product name "Parkid V") in Preparation Example 5 was changed to 18 parts of the interesterified oil having 46° C. of melting point (manufactured by FUJI OIL CO., LTD., the product name "Parkid V") and 18 parts of refined rapeseed oil.

Formulations of Preparation Example 1 to Preparation Example 6 are shown in Table 1.

TABLE 1

| (Unit: %) | | | | | | |
|---|---|---|---|---|---|---|
| | Preparation Example 1 | Preparation Example 2 | Preparation Example 3 | Preparation Example 4 | Preparation Example 5 | Preparation Example 6 |
| Parkid V | 36 | 18 | 36 | 18 | 36 | 18 |
| Refined rapeseed oil | — | 18 | — | 18 | — | 18 |
| Curry powder | 29 | 29 | 29 | 29 | 29 | 29 |
| Sucrose | 13 | 13 | 5 | 5 | 5 | 5 |
| Glucose | — | — | 8 | 8 | — | — |
| Trehalose | — | — | — | — | 8 | 8 |
| Flour | 11 | 11 | 11 | 11 | 11 | 11 |

TABLE 1-continued (Unit: %)

|  | Preparation Example 1 | Preparation Example 2 | Preparation Example 3 | Preparation Example 4 | Preparation Example 5 | Preparation Example 6 |
|---|---|---|---|---|---|---|
| Salt | 9 | 9 | 9 | 9 | 9 | 9 |
| Sodium glutamate | 2 | 2 | 2 | 2 | 2 | 2 |
| Lecithin | 0.4 | 0.4 | 0.4 | 0.4 | 0.4 | 0.4 |

Example 1

The solid roux 1 prepared in Preparation Example 1 was subjected to heat treatment in a constant-temperature oven at 135° C. for 5 minutes. After that, the solid roux 1 was cooled at room temperature, 20° C. Results of the heat resistance evaluation, the whitening evaluation, and the evaluation of the dispersibility into the oil of the obtained heat-resistant solid roux are shown in Table 2.

Examples 2 to 6

By using each solid roux prepared in Preparation Examples 2 to 6, the heat-resistant solid roux were obtained in the same manner as Example 1. Results of the heat resistance evaluation, the whitening evaluation, and the evaluation of the dispersibility into the oil of the obtained heat-resistant solid roux are shown in Table 2 and Table 3.

Comparative Examples 1 to 6

Results of the heat resistance evaluation, the whitening evaluation, and the evaluation of the dispersibility into the oil of the solid roux 1 to 6 prepared in Preparation Examples 1 to 6 are shown in Table 2 and Table 3.

TABLE 2

|  |  | Example 1 | Comparative Example 1 | Example 2 | Comparative Example 2 | Example 3 | Comparative Example 3 |
|---|---|---|---|---|---|---|---|
| Saccharide content (%) | Sucrose | 13 | 13 | 13 | 13 | 5 | 5 |
|  | Glucose | — | — | — | — | 8 | 8 |
|  | Trehalose | — | — | — | — | — | — |
| Fat | Fat melting point | 46° C. | 46° C. | 36° C. | 36° C. | 46° C. | 46° C. |
| 40° C. | Heat resistance | ⊙ | Δ | ⊙ | X | ⊙ | Δ |
|  | Whitening | ⊙ | Δ | ⊙ | Δ | ⊙ | Δ |
| 50° C. | Heat resistance | ○ | X | Δ | X | ⊙ | X |
|  | Whitening | ⊙ | Δ | ⊙ | X | ⊙ | Δ |
| Dispersibility into hot water |  | ⊙ | ⊙ | ⊙ | ⊙ | ⊙ | ⊙ |

TABLE 3

|  |  | Example 4 | Comparative Example 4 | Example 5 | Comparative Example 5 | Example 6 | Comparative Example 6 |
|---|---|---|---|---|---|---|---|
| Saccharide content (%) | Sucrose | 5 | 5 | 5 | 5 | 5 | 5 |
|  | Glucose | 8 | 8 | — | — | — | — |
|  | Trehalose | — | — | 8 | 8 | 8 | 8 |
| Fat | Fat melting point | 36° C. | 36° C. | 46° C. | 46° C. | 36° C. | 36° C. |
| 40° C. | Heat resistance | ⊙ | X | ⊙ | Δ | ⊙ | X |
|  | Whitening | ⊙ | X | ⊙ | Δ | ⊙ | X |
| 50° C. | Heat resistance | ⊙ | X | ⊙ | X | ○ | X |
|  | Whitening | ⊙ | X | ⊙ | X | ⊙ | X |
| Dispersibility into hot water |  | ⊙ | ⊙ | ⊙ | ⊙ | ⊙ | ⊙ |

As shown in Table 2 and Table 3, the heat-resistant solid roux in Examples 1 to 6 including sucrose, glucose, and trehalose and subjected to heat treatment at 135° C. showed excellent heat resistances at 40° C. and 50° C. Especially, Examples 3 to 6 including glucose or trehalose showed considerably excellent heat resistances at the temperature that exceeds the melting point of the fat in the solid roux (46° C. in Examples 3 and 5, and 36° C. in Examples 4 and 6). In Examples 1 to 6, both of the resistances against whitening on the surface and the dispersibility into the hot water were excellent. However, the solid roux of Comparative Examples 1 to 6 which were not subjected to the heat treatment were each slightly poor to poor in the heat resistance at 40° C. and 50° C., moreover, slightly poor to poor in the resistance against the whitening, and completely insufficient in the heat resistance in the temperature range that exceeds the melting point of the fat in the solid roux. According to these results, it was observed that Examples 4 and 6 obtained by using the solid fat having 36° C. of melting point and having relatively low content of trans fatty acid and saturated fatty acid showed heat resistances comparable to those of Examples 3 and 5 obtained by using the solid fat having 46° C. of melting point and having relatively high content of saturated fatty acid.

Examples 7 and 8 and Comparative Example 7

Heat-resistant solid roux were obtained in the same manner as Example 1 except that the heat treatment temperature was changed to 100° C. (Example 7), 160° C. (Example 8), or 80° C. (Comparative Example 7). Results of the heat resistance evaluation, the whitening evaluation, and the evaluation of the dispersibility into the oil of the obtained heat-resistant solid roux are shown in Table 4.

Examples 9 and 10 and Comparative Example 8

Heat-resistant solid roux were obtained in the same manner as Example 2 except that the heat treatment temperature was changed to 100° C. (Example 9), 160° C. (Example 10), or 80° C. (Comparative Example 8). Results of the heat resistance evaluation, the whitening evaluation, and the evaluation of the dispersibility into the oil of the obtained heat-resistant solid roux are shown in Table 4.

TABLE 4

|  |  | Example 7 | Example 1 | Example 8 | Comparative Example 7 | Example 9 | Example 2 | Example 10 | Comparative Example 8 |
| --- | --- | --- | --- | --- | --- | --- | --- | --- | --- |
| Heat treatment temperature |  | 100° C. | 135° C. | 160° C. | 80° C. | 100° C. | 135° C. | 160° C. | 80° C. |
| Saccharide content (%) | Sucrose | 13 | 13 | 13 | 13 | 13 | 13 | 13 | 13 |
|  | Glucose | — | — | — | — | — | — | — | — |
|  | Trehalose | — | — | — | — | — | — | — | — |
| Fat | Fat melting point | 46° C. | 46° C. | 46° C. | 46° C. | 36° C. | 36° C. | 36° C. | 36° C. |
| 40° C. | Heat resistance | ○ | ⊙ | ⊙ | Δ | ○ | ⊙ | ⊙ | Δ |
|  | Whitening | ⊙ | ⊙ | ⊙ | Δ | ⊙ | ⊙ | ⊙ | Δ |
| 50° C. | Heat resistance | Δ | ○ | ○ | X | Δ | Δ | ○ | Δ |
|  | Whitening | ⊙ | ⊙ | ⊙ | Δ | ⊙ | ⊙ | ⊙ | Δ |
| Dispersibility into hot water |  | ⊙ | ⊙ | ⊙ | ⊙ | ⊙ | ⊙ | ⊙ | ⊙ |

Heat-resistant solid roux were obtained in the same manner as Example 3 except that the heat treatment temperature was changed to 100° C. (Example 11), 160° C. (Example 12), or 80° C. (Comparative Example 9). Results of the heat resistance evaluation, the whitening evaluation, and the evaluation of the dispersibility into the oil of the obtained heat-resistant solid roux are shown in Table 5.

Examples 13 and 14 and Comparative Example 10

Heat-resistant solid roux were obtained in the same manner as Example 4 except that the heat treatment temperature was changed to 100° C. (Example 13), 160° C. (Example 14), or 80° C. (Comparative Example 10). Results of the heat resistance evaluation, the whitening evaluation, and the evaluation of the dispersibility into the oil of the obtained heat-resistant solid roux are shown in Table 5.

TABLE 5

|  |  | Example 11 | Example 3 | Example 12 | Comparative Example 9 | Example 13 | Example 4 | Example 14 | Comparative Example 10 |
| --- | --- | --- | --- | --- | --- | --- | --- | --- | --- |
| Heat treatment temperature |  | 100° C. | 135° C. | 160° C. | 80° C. | 100° C. | 135° C. | 160° C. | 80° C. |
| Saccharide content (%) | Sucrose | 5 | 5 | 5 | 5 | 5 | 5 | 5 | 5 |
|  | Glucose | 8 | 8 | 8 | 8 | 8 | 8 | 8 | 8 |
|  | Trehalose | — | — | — | — | — | — | — | — |

TABLE 5-continued

|  |  | Example 11 | Example 3 | Example 12 | Comparative Example 9 | Example 13 | Example 4 | Example 14 | Comparative Example 10 |
|---|---|---|---|---|---|---|---|---|---|
| Fat | Fat melting point | 46° C. | 46° C. | 46° C. | 46° C. | 36° C. | 36° C. | 36° C. | 36° C. |
| 40° C. | Heat resistance | ⊙ | ⊙ | ⊙ | ◯ | ◯ | ⊙ | ⊙ | Δ |
|  | Whitening | ⊙ | ⊙ | ⊙ | Δ | ⊙ | ⊙ | ⊙ | Δ |
| 50° C. | Heat resistance | ◯ | ⊙ | ⊙ | Δ | Δ | ⊙ | ⊙ | X |
|  | Whitening | ⊙ | ⊙ | ⊙ | Δ | ⊙ | ⊙ | ⊙ | Δ |
| Dispersibility into hot water | | ⊙ | ⊙ | ⊙ | ⊙ | ⊙ | ⊙ | ⊙ | ⊙ |

Examples 15 and 16 and Comparative Example 11

Heat-resistant solid roux were obtained in the same manner as Example 5 except that the heat treatment temperature was changed to 100° C. (Example 15), 160° C. (Example 16), or 80° C. (Comparative Example 11). Results of the heat resistance evaluation, the whitening evaluation, and the evaluation of the dispersibility into the oil of the obtained heat-resistant solid roux are shown in Table 6.

Examples 17 and 18 and Comparative Example 12

Heat-resistant solid roux were obtained in the same manner as Example 6 except that the heat treatment temperature was changed to 100° C. (Example 17), 160° C. (Example 18), or 80° C. (Comparative Example 12). Results of the heat resistance evaluation, the whitening evaluation, and the evaluation of the dispersibility into the oil of the obtained heat-resistant solid roux are shown in Table 6.

Preparation Example 7

Flour roux was prepared by performing roasting treatment to 23.5 parts of flour, 18 parts of interesterified oil having 46° C. of melting point (manufactured by FUJI OIL CO., LTD., the product name "Parkid V") and 18 parts of refined rapeseed oil. Then, 59.5 parts of the flour dough, 29 parts of curry powder, 0.5 part of glucose-1-hydrate (manufactured by San-ei Sucrochemical Co., Ltd., the product name "Hi-MESH"), 9 parts of salt, 1.6 parts of sodium glutamate, and 0.4 part of lecithin were heated at 80° C. and mixed by a mixer. The obtained dough was poured into a round aluminum foil container having 3 cm of diameter to 1 cm of thickness, and cooled at 20° C. and solidified to obtain solid roux 7.

Preparation Example 8

Solid roux 8 was obtained in the same manner as Preparation Example 7 except that the flour in Preparation

TABLE 6

|  |  | Example 15 | Example 5 | Example 16 | Comparative Example 11 | Example 17 | Example 6 | Example 18 | Comparative Example 10 |
|---|---|---|---|---|---|---|---|---|---|
| Heat treatment temperature | | 100° C. | 135° C. | 160° C. | 80° C. | 100° C. | 135° C. | 160° C. | 80° C. |
| Saccharide content (%) | Sucrose | 5 | 5 | 5 | 5 | 5 | 5 | 5 | 5 |
|  | Glucose | — | — | — | — | — | — | — | — |
|  | Trehalose | 8 | 8 | 8 | 8 | 8 | 8 | 8 | 8 |
| Fat | Fat melting point | 46° C. | 46° C. | 46° C. | 46° C. | 36° C. | 36° C. | 36° C. | 36° C. |
| 40° C. | Heat resistance | ⊙ | ⊙ | ⊙ | ◯ | ◯ | ⊙ | ⊙ | Δ |
|  | Whitening | ⊙ | ⊙ | ⊙ | Δ | ⊙ | ⊙ | ⊙ | Δ |
| 50° C. | Heat resistance | ⊙ | ⊙ | ⊙ | ◯ | Δ | ◯ | ◯ | X |
|  | Whitening | ⊙ | ⊙ | ⊙ | ◯ | ◯ | ⊙ | ⊙ | X |
| Dispersibility into hot water | | ⊙ | ⊙ | ⊙ | ⊙ | ⊙ | ⊙ | ⊙ | ⊙ |

As shown in Table 4 to Table 6, the heat-resistant solid roux in Examples 1 to 6 including sucrose, glucose, and trehalose and subjected to heat treatment at 135° C. showed excellent heat resistance at 40° C. and 50° C. When the heat treatment temperature was 100° C., the heat resistances at 40° C. and 50° C. each tended to slightly decrease compared with those of the heat treatment at 135° C. When the heat treatment temperature was 160° C., excellent heat resistances at 40° C. and 50° C. were obtained similarly to the heat treatment at 135° C., but development of a slightly burnt-deposit-smell flavor was felt. When the heat treatment temperature was 80° C., development of the heat resistances at 40° C. and 50° C. each tended to significantly decrease.

Example 7 was changed to 22.5 parts, and the glucose-1-hydrate in Preparation Example 7 was changed to 1.5 parts.

Preparation Example 9

Solid roux 9 was obtained in the same manner as Preparation Example 7 except that the flour in Preparation Example 7 was changed to 16 parts, and the glucose-1-hydrate in Preparation Example 7 was changed to 8 parts.

Preparation Example 10

Solid roux 10 was obtained in the same manner as Preparation Example 7 except that the flour in Preparation Example 7 was changed to 4 parts, and the glucose-1-hydrate in Preparation Example 7 was changed to 20 parts.

Preparation Example 11

Solid roux 11 was obtained in the same manner as Preparation Example 7 except that the flour in Preparation Example 7 was changed to 2 parts, and the glucose-1-hydrate in Preparation Example 7 was changed to 22 parts.

Formulations of the solid roux in Preparation Example 7 to Preparation Example 11 are shown in Table 7.

TABLE 7

(Unit: %)

|  | Preparation Example 7 | Preparation Example 8 | Preparation Example 9 | Preparation Example 10 | Preparation Example 11 |
|---|---|---|---|---|---|
| Parkid V | 18 | 18 | 18 | 18 | 18 |
| Refined rapeseed oil | 18 | 18 | 18 | 18 | 18 |
| Curry powder | 29 | 29 | 29 | 29 | 29 |
| Glucose | 0.5 | 1.5 | 8 | 20 | 22 |
| Flour | 23.5 | 22.5 | 16 | 4 | 2 |
| Salt | 9 | 9 | 9 | 9 | 9 |
| Sodium glutamate | 2 | 2 | 2 | 2 | 2 |
| Lecithin | 0.4 | 0.4 | 0.4 | 0.4 | 0.4 |

Example 19 to Example 21 and Comparative Example 13 to Comparative Example 14

The heat treatment was performed on the solid roux 7 to the solid roux 11 prepared in Preparation Example 7 to Preparation Example 11 in a constant-temperature oven at 135° C. for 5 minutes. After that, the solid roux were cooled at room temperature, 20° C. Results of the heat resistance evaluation, the whitening evaluation, and the evaluation of the dispersibility into the oil of the obtained heat-resistant solid roux are shown in Table 8.

TABLE 8

|  |  | Comparative Example 13 | Example 19 | Example 20 | Example 21 | Comparative Example 14 |
|---|---|---|---|---|---|---|
| Saccharide content (%) | Glucose | 0.5 | 1.5 | 8 | 20 | 22 |
| Fat | Fat melting point | 36° C. | 36° C. | 36° C. | 36° C. | 36° C. |
| 40° C. | Heat resistance | Δ | ⊙ | ⊙ | ⊙ | ⊙ |
|  | Whitening | Δ | ○ | ⊙ | ⊙ | ⊙ |
| 50° C. | Heat resistance | X | ○ | ⊙ | ⊙ | ⊙ |
|  | Whitening | Δ | ○ | ⊙ | ⊙ | ⊙ |
| Dispersibility into hot water |  | ⊙ | ⊙ | ⊙ | ○ | Δ |

As shown in Table 8, Preparation Examples 19 to 21 including 1.5 to 20% of the glucose-1-hydrate showed the excellent heat resistance and the excellent resistance against the whitening at 40° C. and 50° C. that exceeds the melting point of the fat in the solid roux. Comparative Example 13 including 0.5% of the glucose-1-hydrate showed insufficient heat resistance. Comparative Example 14 including 22% of glucose showed that the increase of the viscosity of the solid roux dough was remarkable to make pouring into the mold difficult, and showed decrease of the dispersibility into the hot water and decrease of the rich taste in the solid roux.

INDUSTRIAL APPLICABILITY

The present invention enables to provide a method for producing a solid roux having shape-retaining property in summer, resistance against seeping of the liquid oil component, resistance against the whitening of the surface, and good melting speed in the mouth, and reduction of contents of trans fatty acid and saturated fatty acid at the same time.

The invention claimed is:

1. A method for producing a heat-resistant solid roux, comprising:
    mixing ingredients comprising flour, fat and one or more saccharides selected from glucose, glucose-1-hydrate, sucrose, maltose, trehalose, fructose, palatinose, reducing palatinose, maltitol, erythritol, lactitol, and sorbitol, to prepare a dough for the solid roux;
    subjecting the dough to a first heating treatment to prepare the dough in a molten state;
    pouring the molten dough into a container; and then
    subjecting the dough to a second heating treatment at 120 to 160° C. for 60 minutes or less, and then cooling to solidify the dough,
    wherein the dough comprises 3 to 20% by weight of the one or more saccharides, and wherein at least 3 to 12% by weight of the one or more saccharides is glucose-1-hydrate.

2. The method for producing a heat-resistant solid roux according to claim 1, wherein the dough comprises one or more saccharides selected from trehalose, palatinose, glucose, and glucose-1-hydrate.

3. The method for producing a heat-resistant solid roux according to claim 1, wherein at least 5 to 10% by weight of the one or more saccharides is glucose-1-hydrate.

4. A heat-resistant solid roux according to claim 1, wherein the solid roux has heat resistance in a temperature range from 40 to 90° C.

5. The heat-resistant solid roux according to claim 4, wherein the solid roux comprises 3 to 25% by weight of flour.

6. The heat-resistant solid roux according to claim 5, wherein a water content of the solid roux is 2% by weight or less.

7. The heat-resistant solid roux according to claim 5, wherein a water content of the solid roux is 1% by weight or less.

8. The heat-resistant solid roux according to claim 4, wherein a water content of the solid roux is 2% by weight or less.

9. The heat-resistant solid roux according to claim 4, wherein a water content of the solid roux is 1% by weight or less.

10. A processed food obtained by using the heat-resistant solid roux according to claim 1.

11. The method for producing a heat-resistant solid roux according to claim 1, wherein the solid roux comprises 3 to 25% by weight of flour.

12. The method for producing a heat-resistant solid roux according to claim 11, wherein a water content of the solid roux is 1% by weight or less, and wherein the second heating treatment is carried out for 10 seconds to 40 minutes.

13. The method for producing a heat-resistant solid roux according to claim 1, wherein a water content of the solid roux is 2% by weight or less.

14. The method for producing a heat-resistant solid roux according to claim 13, wherein the second heating treatment is carried out for 10 seconds to 40 minutes.

15. The method for producing a heat-resistant solid roux according to claim 1, wherein a water content of the solid roux is 1% by weight or less.

16. The method for producing a heat-resistant solid roux according to claim 15, wherein the second heating treatment is carried out for 10 seconds to 40 minutes.

17. The method for producing a heat-resistant solid roux according to claim 1, wherein the second heating treatment is carried out for 10 seconds to 40 minutes.

* * * * *